US010735202B2

(12) United States Patent
Jayachandran et al.

(10) Patent No.: US 10,735,202 B2
(45) Date of Patent: Aug. 4, 2020

(54) ANONYMOUS CONSENT AND DATA SHARING ON A BLOCKCHAIN

(71) Applicant: International Business Machines Corporation, Armonk, NY (US)

(72) Inventors: Praveen Jayachandran, Bangalore (IN); Apurva Kumar, Uttar Pradesh (IN); Yu Chin Fabian Lim, Phoenix, AZ (US); Venkatraman Ramakrishna, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 15/657,597

(22) Filed: Jul. 24, 2017

(65) Prior Publication Data
US 2019/0028277 A1  Jan. 24, 2019

(51) Int. Cl.
*H04L 9/32* (2006.01)
*H04L 9/06* (2006.01)
*H04L 9/08* (2006.01)

(52) U.S. Cl.
CPC .......... *H04L 9/3247* (2013.01); *H04L 9/0637* (2013.01); *H04L 9/085* (2013.01); *H04L 9/3239* (2013.01); *H04L 2209/38* (2013.01); *H04L 2209/42* (2013.01)

(58) Field of Classification Search
CPC ..... H04L 9/3247; H04L 9/0637; H04L 9/085; H04L 2209/38; H04L 2209/42; H04L 9/3239
See application file for complete search history.

(56) References Cited

U.S. PATENT DOCUMENTS

| 2017/0076286 | A1  | 3/2017  | Castinado et al. |
| 2017/0300627 | A1* | 10/2017 | Giordano ............... G16H 10/60 |
| 2018/0060496 | A1* | 3/2018  | Bulleit .................. G16H 10/60 |
| 2018/0204213 | A1* | 7/2018  | Zappier .................. H04L 63/08 |

OTHER PUBLICATIONS

G. Zyskind, O. Nathan and A. . Pentland, "Decentralizing Privacy: Using Blockchain to Protect Personal Data," 2015 IEEE Security and Privacy Workshops, San Jose, CA, 2015, pp. 180-184. (Year: 2015).*

* cited by examiner

*Primary Examiner* — Theodore C Parsons

(57) ABSTRACT

An example operation may include one or more of storing a user profile in a blockchain by an authorized member of the blockchain, receiving a request by another authorized member of the blockchain to access the user profile, identifying the request for the user profile is from the another authorized member of the blockchain, creating a signed message that includes consent to share the user profile with the another authorized member of the blockchain, and transmitting the signed message to the another authorized member of the blockchain, and wherein an exchange of the user profile between the blockchain members is performed without revealing blockchain member identities of the authorized member of the blockchain and the another authorized member of the blockchain to any of the blockchain members.

12 Claims, 7 Drawing Sheets

ANONYMOUS CONSENT AND DATA SHARING ON A BLOCKCHAIN

TECHNICAL FIELD

This application generally relates to providing access to data on a blockchain and more particularly to anonymous consent and data sharing on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

User consent-based resource sharing is common. There are various protocols and systems used for third party access to user resources on a cloud server. Service providers can often benefit from sharing common customer information with each other to save time and resources as well as optimize compliance, risk management and customer experiences. For example, a particular area or region can agree to share verified personal information for improving compliance with know your customer (KYC) standards. If one customer makes changes (e.g., status change, address change, etc.) then those changes made to the customer data by one provider should be immediately visible to others. However, service providers' relationships with customers must not be revealed while sharing information. Service providers have to respect customers privacy as the customer data is personal in nature and explicit customer consent for sharing each data element must be acquired and recorded for future reference purposes.

Additionally, when a customer decides to revoke access to his or her data to any service provider, that provider must not be able to view any updates to the customer's data thereafter. Most of the shared KYC examples that exist today are centralized and require a central trusted party. Ongoing efforts to create decentralized data sharing based on KYC standards do not provide a mechanism for selectively sharing data with parties operating under a smart contract. Creating such privacy mechanisms is also burdensome since the underlying blockchain technology generally does not support anonymity.

SUMMARY

One example embodiment may provide a method of operation which includes one or more of storing a user profile in a blockchain by an authorized member of the blockchain, receiving a request by another authorized member of the blockchain to access the user profile, identifying the request for the user profile is from the another authorized member of the blockchain, creating a signed message that includes consent to share the user profile with the another authorized member of the blockchain, and transmitting the signed message to the another authorized member of the blockchain, and wherein an exchange of the user profile between the blockchain members is performed without revealing blockchain member identities of the authorized member of the blockchain and the another authorized member of the blockchain to any of the blockchain members.

Another example embodiment may provide a processor configured to perform one or more of store a user profile in a blockchain by an authorized member of the blockchain, a receiver configured to receive a request by another authorized member of the blockchain to access the user profile, and the processor is further configured to identify the request for the user profile is from the another authorized member of the blockchain, create a signed message comprising consent to share the user profile with the another authorized member of the blockchain, and a transmitter configured to transmit the signed message to the another authorized member of the blockchain, and the exchange of the user profile between the blockchain members is performed without revealing blockchain member identities of the authorized member of the blockchain and the another authorized member of the blockchain to any of the blockchain members.

Still another example embodiment may provide a non-transitory computer readable storage medium configured to store instructions that when executed cause a processor to perform one or more of storing a user profile in a blockchain by an authorized member of the blockchain, receiving a request by another authorized member of the blockchain to access the user profile, identifying the request for the user profile is from the another authorized member of the blockchain, creating a signed message that includes consent to share the user profile with the another authorized member of the blockchain, and transmitting the signed message to the another authorized member of the blockchain, and wherein an exchange of the user profile between the blockchain members is performed without revealing blockchain member identities of the authorized member of the blockchain and the another authorized member of the blockchain to any of the blockchain members.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to a mechanism that permits a user/consumer/customer to share his/her data/resources hosted by a first provider or original provider with another provider without the providers learning each other's identity. This configuration does not rely on a trusted party and uses a blockchain to enable access to user profile information and maintain anonymity of third parties seeking access to the user profile information.

Figure 1A:
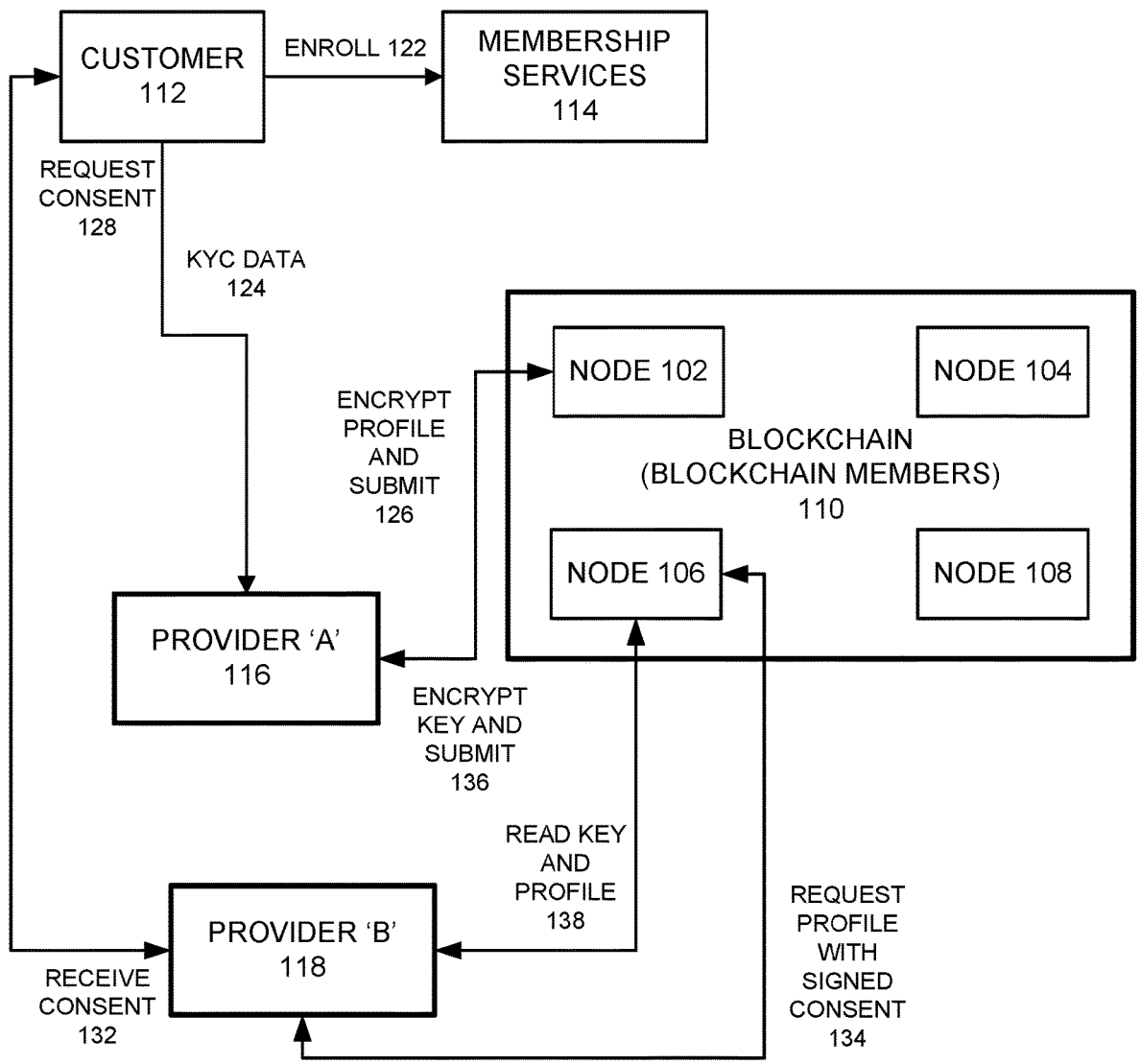
FIG. 1A illustrates a logic diagram of access and authorization via a blockchain, according to example embodiments.

FIG. 1A illustrates a logic diagram of access and authorization via a blockchain, according to example embodiments. Referring to FIG. 1A, the configuration 100 includes a customer device 112, such as a computing device (e.g., smartphone, tablet, laptop, computer, or other computing device with a memory and processor). Other components may include but are not limited to providers 'A' 116 and 'B' 118, (i.e., organization). The provider 116 may be a first provider that has an established account profile stored in a blockchain on behalf of the customer device 112. The provider 118 may be a third party provider seeking access to the user credentials (i.e., name, profile information, verified identity documents etc.), and which does not already have such information or access to an established user profile created when the customer setup an account with the first provider 116. The blockchain members 102-108 may represent established leaders or consensus members to the blockchain 110. The providers may also be members to the blockchain and participate in consensus.

In operation, a customer device 112 may enroll 122 to membership services 114 which would receive customer account information and store the information in a profile space of the blockchain. The provider 116 may receive the customer information (KYC) 124 and create a user profile based on a new account, updated account, etc. The information may be encrypted and stored 126 in the blockchain 110. Subsequently, another provider 118 may request consent 128 and receive consent 132 from the customer device 112. The consent may be a signed message that includes an encryption key or other information necessary to identify the customer profile and access the information. The third party/provider 118 may then use the signed credentials to request the customer information 134 directly from the blockchain 110 without communicating with the original provider 116. The original provider 116 may submit an encryption key 136 that can be used to decrypt the customer profile. A blockchain member or other processing entity may grant the access 138 based on information stored in a smart contract stored in the blockchain. The information may then be received, decrypted and used by the third party provider 118.

Permissioned blockchains support confidentiality in a limited way. This is usually to restrict access of users running light nodes, which simply submit transactions, rather than full nodes that execute the smart contract and consensus algorithm. Service providers execute full nodes while their customers usually execute light nodes, which requires an additional security mechanism to be introduced to restrict access of full nodes. The security approach has to be linked with consent based access. The customer consent must be managed so that it does not leak customer-provider relationship information. Customer data, though accessible to everyone on the blockchain network, must be readable only by a dynamically changing subset of peers. At the same time, blockchain regulators may require full visibility of real entities and relationships participating in the transaction.

Smart contracts are self-executing agreements between parties. Each contract is associated with a state which is agreed upon through distributed consensus and replicated across several participants. Customer data is part of this state and is managed by the smart contract. The identities of transaction owners are only visible to authorized entities, such as auditors. For other nodes, the identity of transaction owners is hidden in an anonymity set (e.g. set of all users) and transactions from the same user cannot be linked with each other. This type of configuration is ensured through transactional identities such as transaction certificates. The customer profile stored on blockchain is encrypted. A provider having authorization, adds/updates a customer record to the blockchain after encryption using a newly generated symmetric key. A request to access the profile can thus be seen as a request to the blockchain for the decryption key. For anonymous key-sharing, to avoid peer-to-peer key exchange that may violate the privacy of providers, the key is exchanged through the blockchain itself. Relying on a trusted PKI, the profile decryption key is itself encrypted in such a way that only other authorized providers on the blockchain network will be able to decrypt the key.

Signed consent and ACL-based access and revocation may include a blockchain using a signed message representing customer's consent to authorize a provider for read/write access to the customer profile. Access may be achieved without revealing a real identity of a provider to other members, otherwise the constraint will be violated. Upon revocation, the signed message on the blockchain is invalidated, and a different decryption key is generated to satisfy another constraint. The chaincode authorization decision is decentralized and is implemented in chaincode and thus ensures consensus among members. Consent signed by a customer must not explicitly identify provider B to satisfy the anonymous constraint. The customer must ensure that the consent request was originated by provider B and not replayed by an unauthorized party. The consent must be explicitly bound to the profile request so that it cannot be misused. The profile must be readable only by a provider possessing valid consent from the customer. An auditor must be able to unambiguously map the identity in the consent to a real identity. Consent revocation signed by a customer must not explicitly identify the third party provider. Future updates to customer profile should not be readable to that revoked service provider.

Figure 1B:
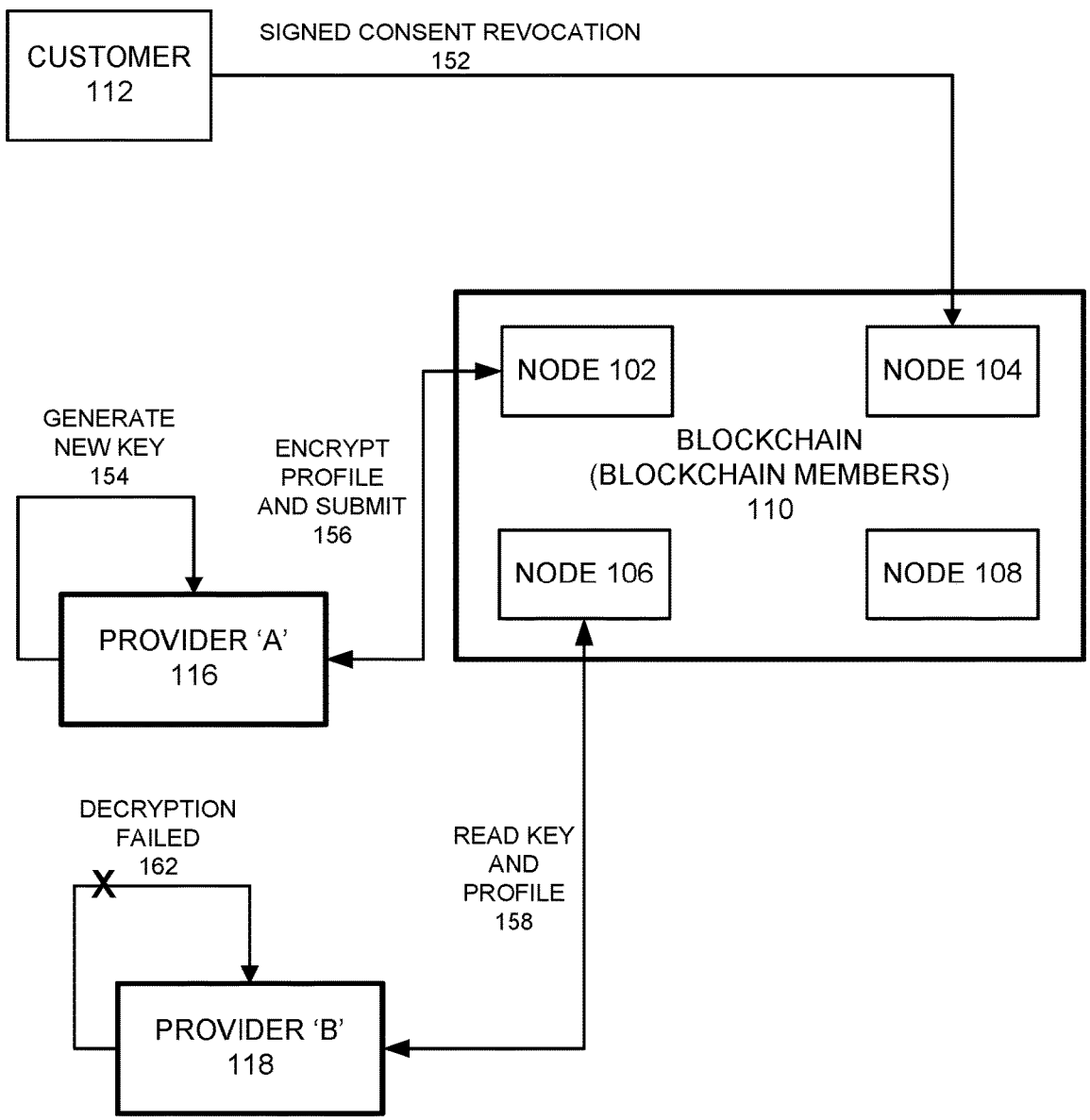
FIG. 1B illustrates a logic diagram of access and authorization revocation, according to example embodiments.

FIG. 1B illustrates a logic diagram of access and authorization revocation, according to example embodiments. Referring to FIG. 1B, the configuration 150 provides an example of revoking a previously consented access right. The customer device 112 may be the initiator of the revocation operation 152 by notifying the blockchain of a decision to revoke a previously granted access right. The provider 116 may, periodically, or via a trigger from an access revocation operation, generate a new key 154 and encrypt the customer profile via the new key 156. In operation, the previously privileged third party provider 118 may now attempt to read the new key and customer profile 158 and decrypt the profile unsuccessfully 162.

Figure 2:
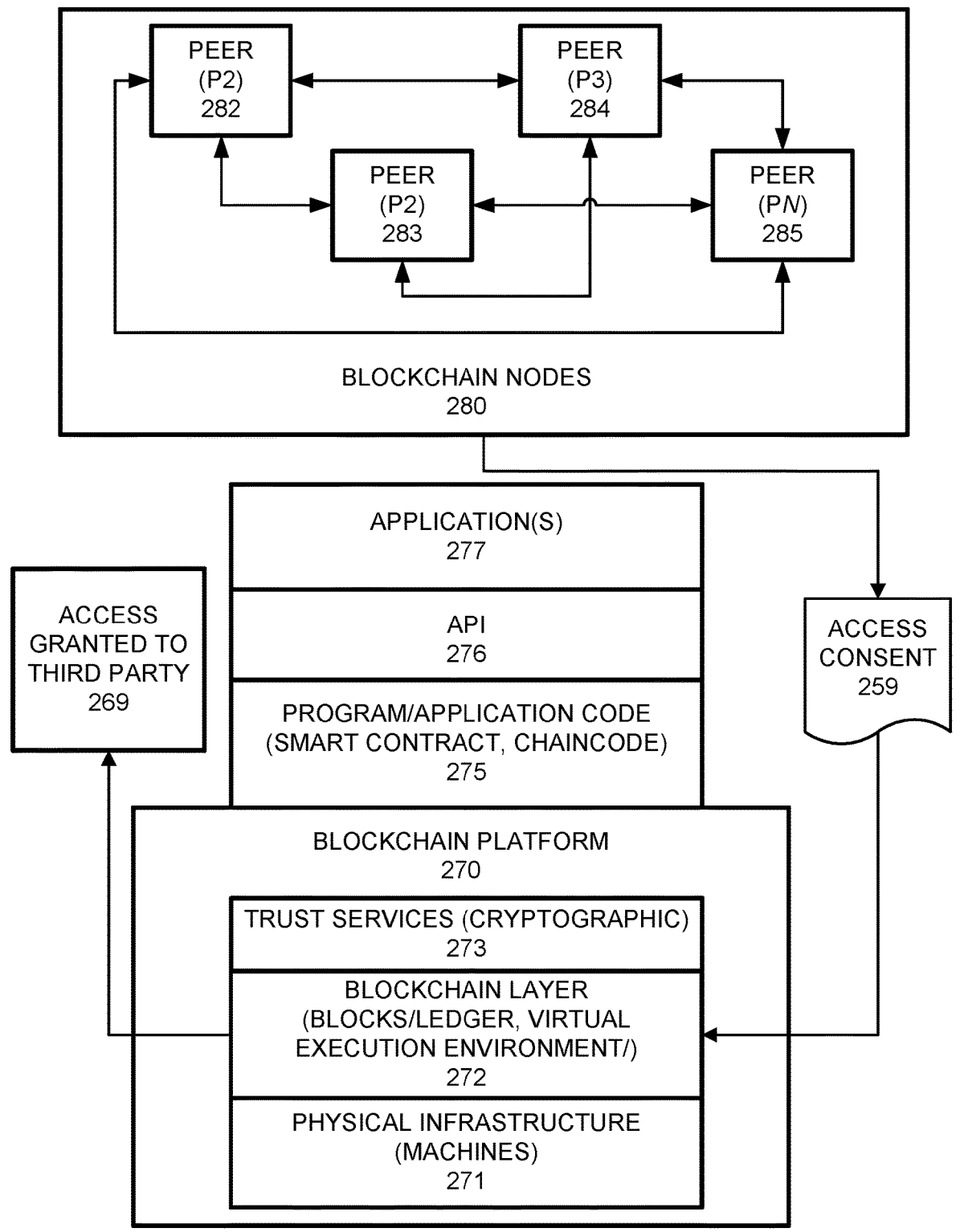
FIG. 2 illustrates an example blockchain configuration for performing the authentication access, according to example embodiments.

FIG. 2 illustrates an example blockchain configuration for performing the authentication access, according to example embodiments. Referring to FIG. 2, the blockchain system 200 may include certain common blockchain elements, such as a group of blockchain nodes 280, which may be assigned peer blockchain nodes 282-285 which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. For example, the consent 259 sent from the customer device may be processed by one or more processing entities (virtual machines) in the blockchain execution layer 272. The result may include access being granted 269 to a third party entity/application from the blockchain computing environment (VM). In this example, customer account information or data template information may be stored in the blockchain 270. The physical machines 271 may be accessed to retrieve the customer information which can then be decrypted by the anonymous and authorized third parties.

Within the chaincode, a smart contract may be created via a high-level application and programming language, then converted to a string that is written to a block in the blockchain. The smart contract is invoked by a user device submitted operation. The smart contract may write data to the blockchain in the format of key-value pairs. Later, the smart contract code can read the values stored in the blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

The chaincode is the code interpretation of the smart contract, with additional features. A chaincode is program code deployed on the network, where it is executed and validated by chain validators together during a consensus process. In operation, a customer device may submit an access request which triggers a smart contract authentication routine via chaincode.

In one example, a customer may request onboarding or a setup process with a first organization/service provider 'A'. The provider may check a blockchain for any KYC information already existing. If no KYC information is found on the blockchain, the organization requests KYC information from the customer device which uploads information and supporting documentation as needed. After verification, the provider encrypts KYC information and submits that information to a blockchain. The customer device may then use a KYC application to request onboarding with another organization 'B'. The third party 'B' may query the blockchain for KYC information. In all likelihood, the request may be denied without prior access privileges being granted. A request for the customer consent may be sent for access to the customer's KYC data. The customer may provide consent to B's requests for blockchain access. The provider 'B' may then attempt again to access the KYC information again, however, this time with the signed consent. The chaincode may authorize the request and the blockchain may notify provider 'A' of the authorization event and 'A' may perform targeted release of the corresponding profile encryption key.

In an example of revocation of access rights, a customer device may access the KYC application to request revocation of organization 'B's rights. In operation, the KYC application operating on the device may submit a revocation instruction to the blockchain. The blockchain notifies both organization A and B of the revocation event. The organization 'A' generates a new key and re-encrypts the customer profile and also submits both an encrypted key and encrypted profile to the blockchain. Organization B the requests from the blockchain for the customer KYC information. Even if the chaincode authorizes the request, 'B' cannot read the information retrieved because it does not have the right decryption key in this case. Another example may be where the customer does not have an identity on the blockchain. The customer consent can be recorded by a trusted party (e.g., a government agency) which then produces the signed consent on the customer's behalf.

Profile updates can be processed by completely overwriting the profile after encrypting with a new key generated by the updating provider. Subsequent profile access attempts for a provider that has been granted access to a customer profile, do not require customer interaction. The provider only needs to prove ownership of the certificate for which consent was granted. Auditors can be given on-demand access to a customer profile in the same way a service provider would receive consent from the customer and by key-sharing on blockchain. A similar approach may be used to control access to a group of fields/specific field in the customer profile. Also, this approach can provide support for larger profiles being stored off-chain, with only a link and a hash stored on the ledger. Several variations of the workflow using the same or similar approaches are also possible. Such variations should be considered additional embodiments. In one such embodiment, the customer directly transacts and record its consent with the post anonymizing the provider of interest on the blockchain.

Multi-party consent can also be facilitated using the workflow, so that a group of "customers" can control access to a group profile on the blockchain. The workflow can be augmented to add trusted third-party verification of profile data. Since customer consent on record only identifies owner of a transaction certificate, it is possible for providers to collude by sharing transaction certificate credentials. This does not increase the risk to unauthorized customer data since any party given access to the profile could always share that information directly with any other party. However, to reduce the likelihood of customer repudiations, the message signed by the customer device may also include a part that is visible only to an auditor by using the auditor's public key. This data portion includes the real identity of the provider to which the customer granted access. Access to this information permits the auditor to handle repudiation cases.

Various account information may be retrieved for various service providers. Also, background checks can easily be performed by job-seekers moving from one employer to another, or employed with multiple agencies at the same time. Employers or authorization parties may desire to access such records for the purpose of background checks, however, a job seeker understandably would not wish to expose this information in public without an incentive.

Figure 3:
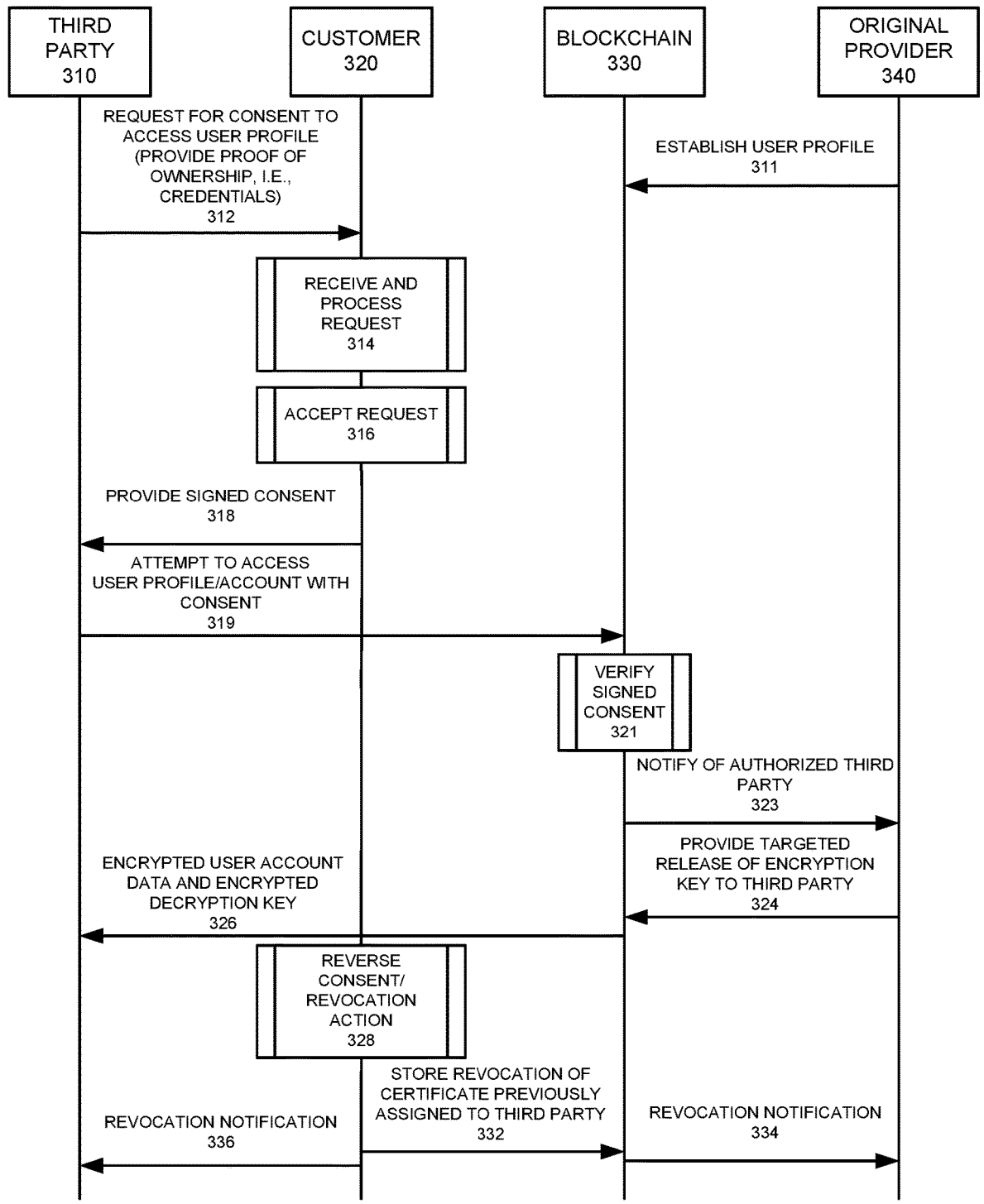
FIG. 3 illustrates a system messaging diagram for managing access and revocation of access privileges, according to example embodiments.

FIG. 3 illustrates a system messaging diagram 300 for managing access and revocation of access privileges, according to example embodiments. Referring to FIG. 3, the system may include a number of components or modules which may include software, hardware or a combination of both. The components may include a first component, such as a third party organization 310 desiring access to an established set of user profile information, a second component, such as a customer device 320, a third component, such as an original provider 340 that setup the account information for the user profile and a fourth component, such as a blockchain 330. It is further assumed that prior to this exchange the encrypted customer profile was already submitted to the blockchain by the original provider. A virtual machine may be linked to the blockchain data to process the requests, access the smart contracts and perform other related processing tasks. In operation, the original provider 340 may setup a user profile 311 prior to any access attempts by third parties. The third party may request access to a user/customer profile 312. This request may require a proof of ownership of a credential, which may include a certificate or other credential item. Apart from identifying the requested fields, the request also includes an alternative transactional identity and the proof of owning that identity. The request may be forwarded to the customer device for verification and confirmation 314 and possibly an acceptance 316. The signed consent 318 may be sent as a message to the third party platform 310. The third party 310 may attempt to access the user profile/account information with the granted consent 319. The signed consent 321 may be verified by the blockchain 330. The original provider 340 may be notified 323 of the new access consent granted to the third party. The original provider may be responsible for submitting the targeted release 324 of an encryption key to the third party. The targeted release implies that the only party with access to the encryption key is the known third party attempting to obtain such access rights. Targeted release/disclosure may provide that the key can be accessed only by the authorized third party. This can be performed by encrypting the data with the public key of a transaction certificate used in the signed consent, and sharing it on blockchain.

Instead of identifying the real identity of the third party, the consent recorded on blockchain 330 identifies the third party using the transactional identity proven earlier. Transaction identities are not linkable to real identities by regular members of the blockchain, at the same time allowing auditors the capability to perform such operations. The encrypted user account data and encrypted decryption key may be sent 326 to the third party 310 and applied to extract the customer data. Subsequently, the customer device may decide to reverse the consent and block access by the third party 328. The revocation information is stored in the blockchain 332 and the original provider 340 is notified 334 as well as the third party via a notification 336.

In one embodiment, the first component, the second component, the third component, and the fourth component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 310, 320, 330, and 340 may be directly connected or communicably coupled to one another, in a wired or wireless manner, and may reside locally and/or remotely.

Figure 4A:
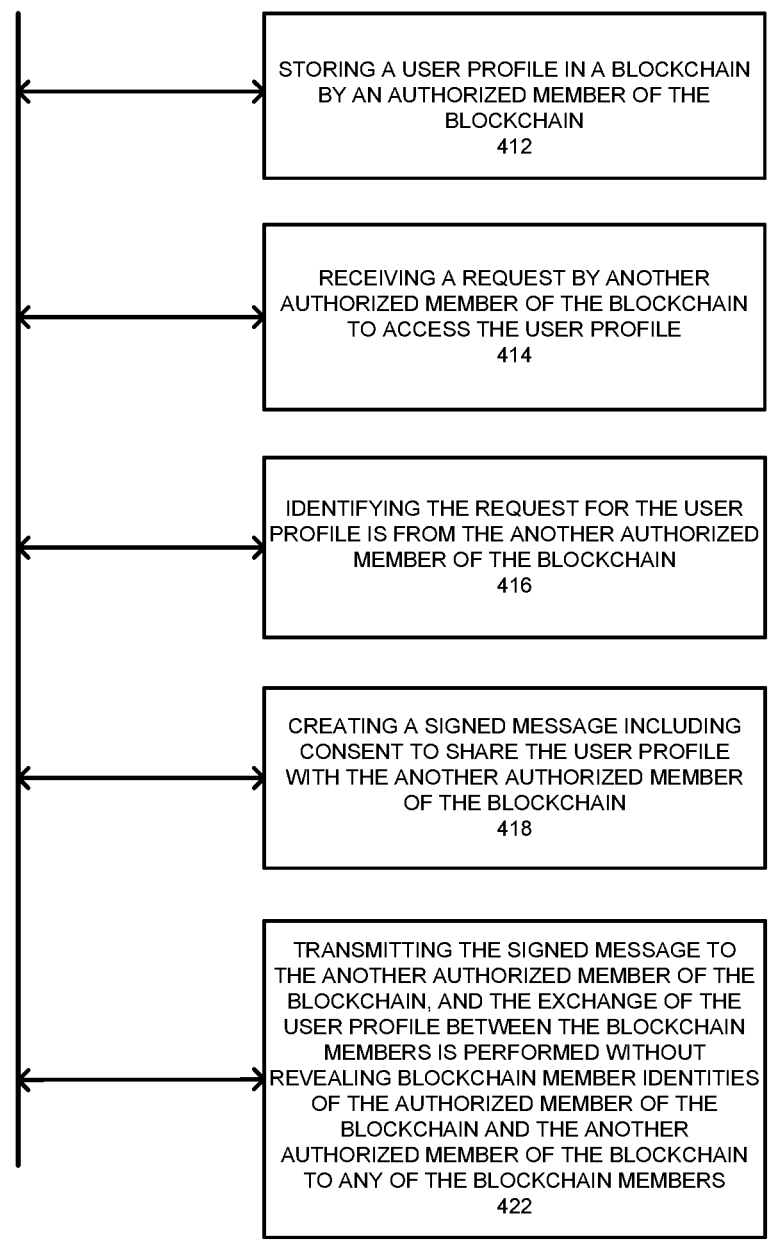
FIG. 4A illustrates a flow diagram of an example method of managing access via a blockchain, according to example embodiments.

FIG. 4A illustrates a flow diagram of an example method of managing access via a blockchain, according to example embodiments. Referring to FIG. 4A, the method 400 may provide storing a user profile in a blockchain by an authorized member of the blockchain 412, receiving a request by another authorized member of the blockchain to access the user profile 414, identifying the request for the user profile is from the another authorized member of the blockchain 416, creating a signed message including consent to share the user profile with the another authorized member of the blockchain 418, and transmitting the signed message to that other authorized member of the blockchain, and the exchanging of the user profile between the blockchain members is performed without revealing blockchain member identities of the authorized member of the blockchain and the another authorized member of the blockchain to any of the blockchain members 422. One way to perform this anonymity is to use one time identifiers or pseudo-identifiers which are not linked to the accounts of the providers seeking access to the user profile data. The pseudo-identifiers are identifiable by auditors at a later time but not by the requesting or granting entities during the actual account access attempts. The user profile may be encrypted. The authorized member of the blockchain and the other authorized member of the blockchain may use the single use identities while performing any one or more of submitting, requesting, consenting and accessing the user profile.

Additionally, the single use identities are separate and unlinked from actual identities of the authorized member of the blockchain and the other authorized member of the blockchain. However, auditors of the blockchain can link the single use identities to the authorized member of the blockchain and the other member of the blockchain. The consent may include read and write access to the user profile, and a key for decrypting the user profile is provided via the blockchain to the requesting authorized member of the blockchain without exposing the key to other blockchain members. The other authorized member of the blockchain requesting access to the user profile is different from the authorized member of the blockchain that created the user profile, and the request may be transmitted to a user device associated with the user profile. The signed consent may be received from the user device, responsive to the request being transmitted the user device.

Figure 4B:
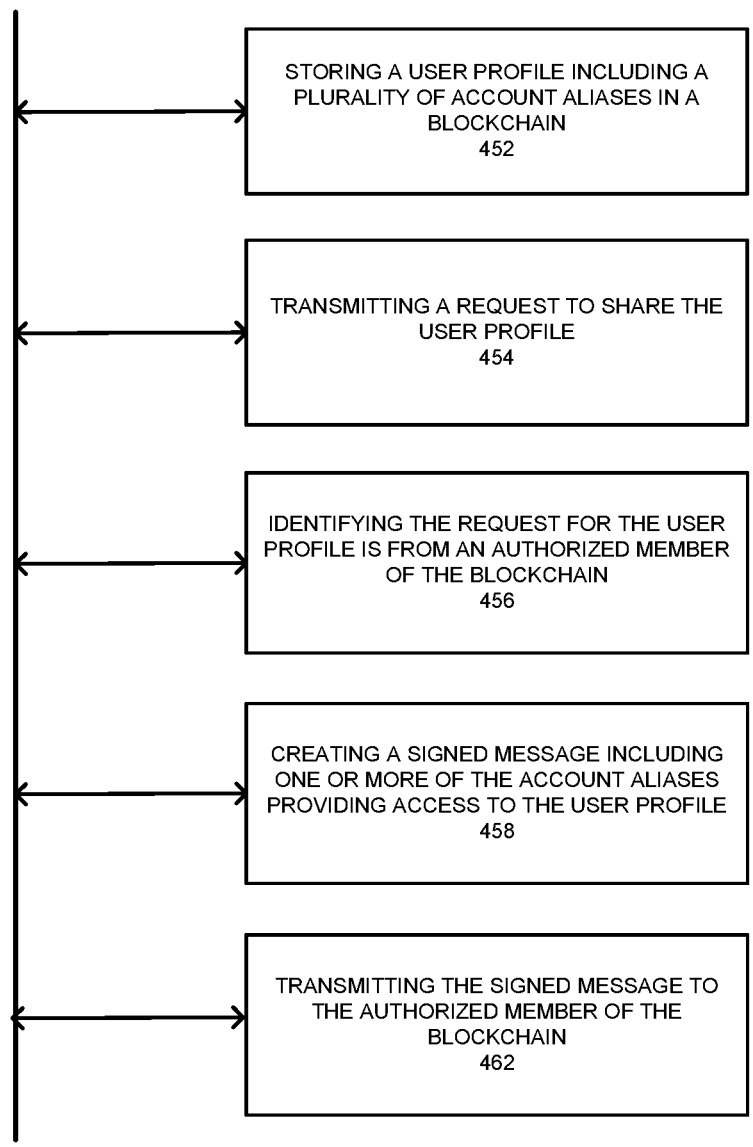
FIG. 4B illustrates another flow diagram of an example method of managing access via a blockchain, according to example embodiments.

FIG. 4B illustrates another flow diagram of an example method of managing access via a blockchain, according to example embodiments. The method 450 may provide storing a user profile including a plurality of account aliases in a blockchain 452, transmitting a request to share the user profile 454, identifying the request for the user profile is from an authorized member of the blockchain 456, creating a signed message comprising one or more of the account aliases providing access to the user profile 458, and transmitting the signed message to the authorized member of the blockchain 462.

In this example, any user profile related account alias could be used to reference the user profile. Example of aliases may be any identifier, such as a telephone number, IP address, GPS location, e-mail address, online social network profile, account identifier (e.g., any user account), etc. The actions taken by a user device may include transactions which reference any one or more of those account aliases depending on the type and nature of the transaction. This provides simple access to a user profile by an authorized third party via any of the account aliases. For example, an organization may be more likely to associate a user device e-mail address, or a social network profile as a valid type of user profile account. This provides the third party with options on how to access the user profile from the blockchain and utilize the one or more aliases of interest to that particular third party. This also offers third parties the option to access the user profile parameters most likely to be associated with the third party while ignoring aliases which are not likely to be of interest to the third party. The signed message may be a secure (SSL) and/or encrypted message which references one or more of the aliases thus permitting the third party to identify and retrieve the alias of interest for the third party services being offered.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
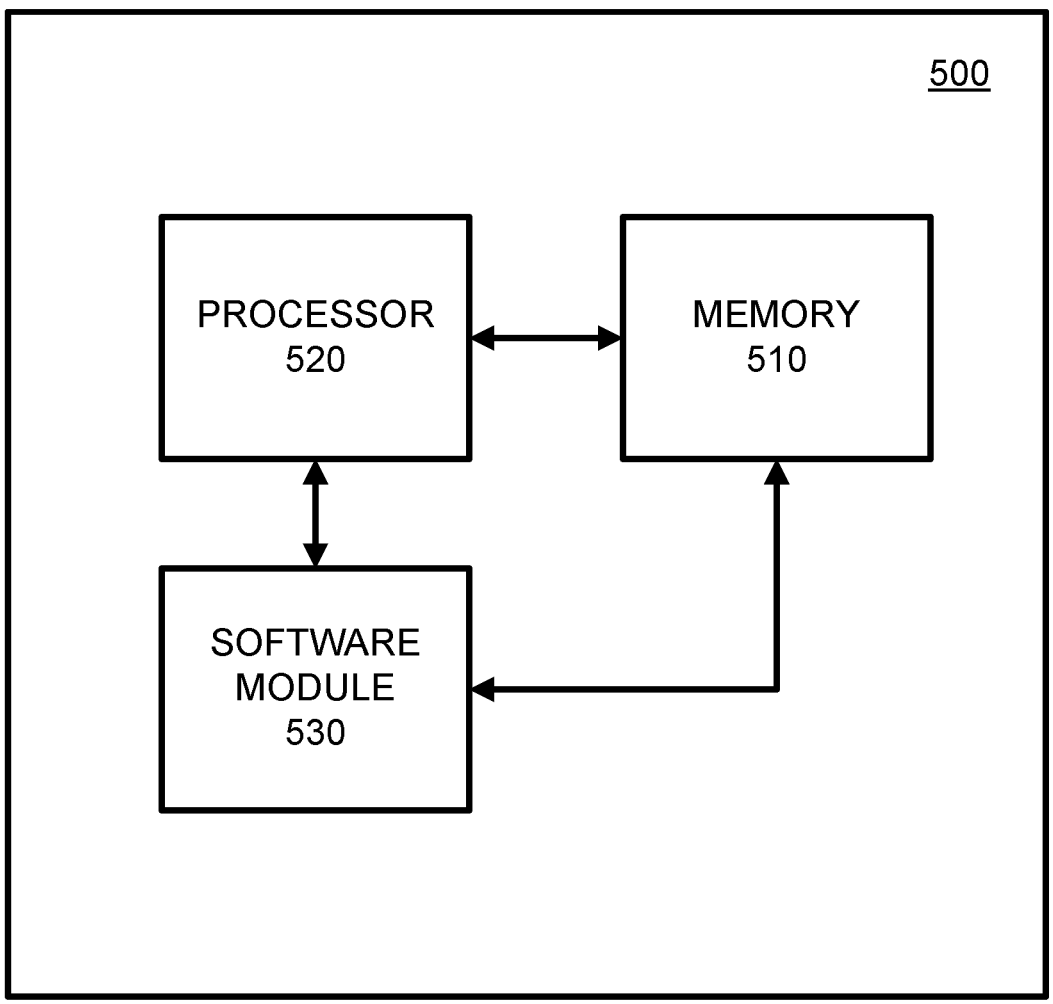
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   sending, via a device associated with a first authorized user of a blockchain, a request to a second authorized member of the blockchain to access an encrypted user profile stored on the blockchain,
   wherein both the first authorized user and the second authorized user use corresponding transaction certificates providing corresponding pseudo-identities that are different than corresponding actual identifies of the first authorized user and the second authorized member, so that an exchange of information associated with the encrypted user profile does not reveal the actual identifies of the first authorized user and the second authorized member to other members of the blockchain, except for auditor blockchain members, and
   wherein the request includes the corresponding single use identity of the first authorized member and proof that the first authorized member owns the corresponding single use identity;
   receiving, via the device, and in response to an identification by the second authorized member that the request is from the first authorized member, a signed consent to share the user profile with the first authorized member of the blockchain based on the corresponding single use identity, and the signed message further including a key of the corresponding transaction certificate of the first authorized member;
   sending, via the device, the signed consent to the blockchain for verification by the blockchain;
   receiving, via the device, encrypted information associated with the encrypted user profile and an encrypted decryption key in response to verification by the blockchain;
   decrypting, via the device, the encrypted decryption key to access the encrypted information using the key of the corresponding transaction certificate.

2. The method of claim 1, wherein the first authorized member of the blockchain and the second authorized member of the blockchain use the pseudo-identities while performing one or more of submitting, requesting, consenting and accessing the user profile.

3. The method of claim 1, wherein the consent comprises read and write access to the user profile.

4. The method of claim 1, wherein
   the second authorized member of the blockchain is different from an authorized member of the blockchain that created the user profile.

5. A device associated with a first authorized user of a blockchain, the device comprising:
   a processor configured to:
   send a request to a second authorized member of the blockchain to access an encrypted user profile stored on the blockchain,
   wherein both the first authorized user and the second authorized user use corresponding transaction certificates providing corresponding pseudo-identities that are different than corresponding actual identifies of the first authorized user and the second authorized member, so that an exchange of information associated with the encrypted user profile does not reveal the actual identifies of the first authorized user and the second authorized member to other members of the blockchain, except for auditor blockchain members, and
   wherein the request includes the corresponding single use identity of the first authorized member and proof that the first authorized member owns the corresponding single use identity;
   receive, via a receiver of the device, and in response to an identification by the second authorized member that the request is from the first authorized member, a signed consent to share the user profile with the first authorized member of the blockchain based on the corresponding single use identity, and the signed message further including a key of the corresponding transaction certificate of the first authorized member;

send, via a transmitter of the device, the signed consent to the blockchain for verification by the blockchain;

receive, via the receiver, encrypted information associated with the encrypted user profile and an encrypted decryption key in response to verification by the blockchain;

decrypt the encrypted decryption key to access the encrypted information using the key of the corresponding transaction certificate.

6. The apparatus of claim 5, wherein the first authorized member of the blockchain and the second authorized member of the blockchain use the pseudo-identities while performing one or more of submitting, requesting, consenting and accessing the user profile.

7. The apparatus of claim 5, wherein the consent comprises read and write access to the user profile.

8. The apparatus of claim 5,
wherein second authorized member of the blockchain is different from an authorized member of the blockchain that created the user profile.

9. A non-transitory computer readable storage medium configured to store one or more instructions that when executed by a processor cause the processor to perform:

sending, via a device associated with a first authorized user of a blockchain, a request to a second authorized member of the blockchain to access an encrypted user profile stored on the blockchain, wherein both the first authorized user and the second authorized user use corresponding transaction certificates providing corresponding pseudo-identities that are different than corresponding actual identifies of the first authorized user and the second authorized member, so that an exchange of information associated with the encrypted user profile does not reveal the actual identifies of the first authorized user and the second authorized member to other members of the blockchain, except for auditor blockchain members, and wherein the request includes the corresponding single use identity of the first authorized member and proof that the first authorized member owns the corresponding single use identity;

receiving, via the device, and in response to an identification by the second authorized member that the request is from the first authorized member, a signed consent to share the user profile with the first authorized member of the blockchain based on the corresponding single use identity, and the signed message further including a key of the corresponding transaction certificate of the first authorized member;

sending, via the device, the signed consent to the blockchain for verification by the blockchain;

receiving, via the device, encrypted information associated with the encrypted user profile and an encrypted decryption key in response to verification by the blockchain;

decrypting, via the device, the encrypted decryption key to access the encrypted information using the key of the corresponding transaction certificate.

10. The non-transitory computer readable storage medium of claim 9, wherein the first authorized member of the blockchain and the second authorized member of the blockchain use the pseudo-identities while performing one or more of submitting, requesting, consenting and accessing the user profile.

11. The non-transitory computer readable storage medium of claim 9, wherein the consent comprises read and write access to the user profile.

12. The non-transitory computer readable storage medium of claim 9, wherein the second authorized member of the blockchain is different from an authorized member of the blockchain that created the user profile.

* * * * *